United States Patent Office 3,324,135
Patented June 6, 1967

3,324,135
4-ALKYL-1-BENZO[f]QUINOLONE-2-CARBOXYLIC ACIDS
George Y. Lesher, Schodack, N.Y., assignor to Sterling Drug Inc., New York, N.Y., a corporation of Delaware
No Drawing. Original application Apr. 19, 1963, Ser. No. 274,313. Divided and this application May 2, 1966, Ser. No. 546,520
8 Claims. (Cl. 260—287)

This application is a division of my copending application S.N. 274,313, filed Apr. 19, 1963.

This invention relates to 4-alkyl-1-benzo[f]quinolone-2-carboxylic acids, their salts and lower-alkyl esters, and the preparation of these compounds.

The physical embodiments of my invention have been tested by standard bacteriological evaluation procedures and found to have antibacterial properties.

Illustrative embodiments of my compounds are those of the Formula I

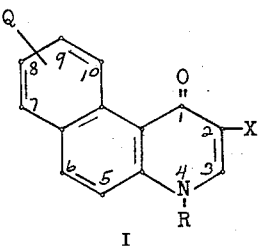

where X is carboxy or lower-carbalkoxy, R is lower-alkyl, and Q is hydroxy, lower-alkoxy or halo; Q can also be lower-alkyl. Preferred embodiments are those where Q represents from one to three said substituents at available ring positions, i.e., positions 5, 6, 7, 8, 9 and 10.

The term "lower-carbalkoxy," as used herein, e.g., for X in Formula I, means carbalkoxy radicals where the alkoxy portion can be straight- or branch-chained and has preferably from one to six carbon atoms, as illustrated by carbomethoxy, carbethoxy, carbo-n-propoxy, carbisopropoxy, carbo-n-butoxy, carbo-n-hexoxy, and the like.

The term "lower-alkyl," as used herein, e.g., for R or Q in Formula I, means alkyl radicals having preferably from one to six carbon atoms, as illustrated by methyl, ethyl, n-propyl, isopropyl, 2-butyl, n-butyl, isobutyl, isoamyl, n-hexyl, and the like.

The term "halo," as used herein, e.g., as one of the meanings for Q in Formula I, means chloro, bromo, iodo or fluoro.

The invention, in its process aspect, comprises reacting a 1-hydroxy-2-X-benzo[f]quinoline with a lower-alkyl ester of a strong inorganic acid or an organic sulfonic acid, having the formula R—An, where An is an anion of a strong inorganic acid, i.e., an acid which is practically completely dissociated in aqueous solution, or of an organic sulfonic acid, e.g., chloride, bromide, iodide, sulfate, benzenesulfonate, para-toluene sulfonate, and the like, and R and X have the meanings given above for Formula I. The chloride, bromide or iodide is preferred because of the more ready availability of the requisite alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, methyl isobutyl ketone, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol solvent, in a mixture of water and a lower-alkanol, or in dimethylformamide.

My process, for the preparation of preferred embodiments, thus comprises reacting the corresponding 1-hydroxy-2-X-benzo[f]quinoline of the Formula II

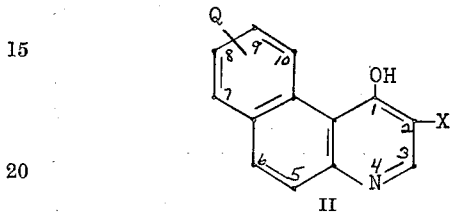

where X is carboxy or lower-carbalkoxy and Q is hydrogen, hydroxy, lower-alkoxy, lower-alkyl or halo, with an ester having the formula R—An, where R has the meaning given above for Formula I and An is an anion of a strong inorganic acid or an organic sulfonic acid, in the presence of an acid-acceptor. The product where Q is hydrogen and R is methyl, which is discussed hereinbelow, is a known compound, having been prepared before by a different method.

When X is carboxy, i.e., when the intermediate is a 1-hydroxybenzo[f]quinoline-2-carboxylic acid, the reaction is conveniently carried out by refluxing the acid with a lower-alkyl ester, preferably halide, in aqueous ethanol in the presence of potassium or sodium hydroxide to yield the corresponding 4-R-1-benzo[f]quinolone-2-carboxylic acid; the same 2-carboxylic acid is also obtained using these reaction conditions and a lower-alkyl 1-hydroxybenzo[f]quinoline-2-carboxylate as the intermediate, the ester hydrolyzing under the reaction conditions to form the acid. If the final product is desired in ester form, e.g., the ethyl ester, the intermediate ethyl 1-hydroxybenzo[f]quinoline-2-carboxylate is reacted as above using a non-aqueous medium, for example, using refluxing ethanol as the solvent and sodium ethoxide as the acid-acceptor or using dimethylformamide as the solvent and anhydrous potassium carbonate as the acid-acceptor. The alkylation of the 1-hydroxybenzo[f]quinoline-2-carboxylic acid can be carried out in the absence of an acid-acceptor by using its di-salt, e.g., by heating a mixture of the anhydrous dipotassium or disodium salt with diethyl sulfate followed by acidification to obtain the 4-ethyl-1-benzo[f]quinolone-2-carboxylic acid.

Also within the scope of the invention are salts of my above-described 4 - R - 1-benzo[f]quinolone-2-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although therapeutically acceptable salts are preferred, other and all cationic salts are within the scope of my invention. All such salts, including those having toxic cations, are useful in characterizing the free acids and as intermediates in purification of the free acids. The salts are prepared from the acids using conventional methods for converting acids into salts.

The molecular structures of my compounds of my invention are established by their mode of synthesis and confirmed by the correspondence of calculated and found values for the elementary analyses for representative examples, and by infrared and ultraviolet spectral analyses.

My 4-R-2-X-1-benzo[f]quinolones when tested according to standard in vitro bacteriological evaluation procedures possess antibacterial activity, for example, against *Staphylococcus aureus, Elberthella typhi, Mycobacterium tuberculosis, Clostridium welchii*, at test concentration levels in the range of 0.0025 mg./cc. to about 1.0 mg./cc., as illustrated below in the examples. Preferred embodiments also were found to have significant in vivo activity against Gram-negative bacteria, e.g., *Klebsiella pneumoniae*, in mice when administered orally and/or subcutaneously at dose levels in the range of about 100 to 400 mg./kg./day.

Also comprehended by my invention is 4-ethyl-1-benzo[f]quinolone-2-carboxylic acid which also has antibacterial properties as illustrated hereinbelow and which was prepared by the process described above and illustrated hereinbelow; alternatively, this acid can be used in the form of a lower-alkyl ester or a therapeutically acceptable salt thereof.

Another aspect of my invention resides in an antibacterial composition comprising as the active ingredient 4-methyl-1-benzo[f]quinolone-2-carboxylic acid, the antibacterial properties of which are illustrated hereinbelow. This compound, known per se, was prepared by the process described generally above and specifically hereinbelow. Also encompassed are antibacterial compositions comprising as the active ingredient said 4-methyl-1-benzo[f]quinolone-2-carboxylic acid in the form of a lower-alkyl ester or a therapeutically acceptable salt thereof, as discussed hereinabove.

Another aspect of my invention is the method of controlling the growth of bacteria which comprises applying thereto an amount toxic to said bacteria of a composition containing 4-methyl-1-benzo[f]quinolone-2-carboxylic acid as an essential active ingredient or, alternatively, containing a lower-alkyl ester or a therapeutically acceptable salt thereof.

Said antibacterial composition can be any one of a variety of formulations, both liquid or solid, including finely-divided powders, granular materials, tablet form, etc., as well as various liquid solutions, concentrates, emulsions, slurries, etc., depending upon the application intended and the formulation media employed; it can be administered orally, parenterally or by local application.

Thus, it will be appreciated that it is contemplated that said known 4 - methyl-1-benzo[f]quinolone-2-carboxylic acid (or derivatives), or any of my new 4-R-2-X-1-benzo[f]quinolones, form an antibacterially active ingredient which may be employed as an essential ingredient in various compositions utilizing a variety of therapeutically acceptable carriers. For example, compositions for oral use are illustrated by solid compositions, e.g., tablets, pills, dispersible powders or granules, or by semi-solid or liquid formulations, e.g., syrups, solutions or dispersions, either for administration per se or in some other suitable way, e.g., in capsules; compositions for oral use also encompass formulations with foodstuffs or for admixture with foodstuffs for veterinary use; compositions for parenteral use are illustrated by sterile isotonic aqueous or non-aqueous solutions or suspensions; and, compositions for local application, that is, for application to local bacterial infections, either external or internal, or to sites, e.g. postoperative wounds, requiring prophylactic antibacterial treatment, are illustrated by creams, ointments or finely-divided powder preparations.

The following examples will further illustrate the invention without, however, limiting it thereto.

*Example 1*

8-bromo-4-methyl-1-benzo[f]quinolone - 2 - carboxylic acid was prepared as follows: To a solution containing 8.7 g. of ethyl 8-bromo-1-hydroxybenzo[f]quinoline-2-carboxylate, 34 cc. of 10% aqueous potassium hydroxide solution and 70 cc. of ethanol was added 7 cc. of methyl iodide and 50 cc. of ethanol, and the resulting mixture was refluxed for about twenty minutes. Since a large quantity of precipitate had separated, there was added to the reaction mixture 150 cc. of water and 34 cc. of 10% aqueous potassium hydroxide solution and refluxing was continued for another six and one half hours, with occasional additions of methyl iodide. More water and 10% potassium hydroxide solution were added to the reaction mixture and refluxing was continued for an additional six hours, with occasional addition of methyl iodide. To the reaction mixture at reflux was added aqueous potassium hydroxide solution, the hot reaction mixture was filtered, and the filtrate was poured into 50 cc. of 6N hydrochloric acid plus water. The resulting precipitate was collected and triturated successively with water and ethanol, and then recrystallized twice from dimethylformamide to yield 5.3 g. of the product, 8-bromo-4-methyl-1-benzo[f]quinolone-2-carboxylic acid, M.P. 325–327° C. with decomposition.

8 - bromo-4-methyl-1-benzo[f]quinolone-2-carboxylic acid was found to have in vivo activity against *Klebsiella pneumoniae* in mice when administered subcutaneously at a dose level of 200 mg./kg./day (8 out of 20 animals survived).

Ethyl 8 - bromo-4-methyl-1-benzo[f]quinolone-2-carboxylate can be obtained by heating ethyl 8-bromo-1-hydroxybenzo[f]quinoline-2-carboxylate with methyl iodide using dimethylformamide as the solvent and anhydrous potassium carbonate as the acid-acceptor.

The intermediate ethyl 8-bromo-1-hydroxybenzo[f]quinoline-2-carboxylate was prepared as follows: A mixture containing 11 g. of diethyl N-(6-bromo-2-naphthyl)aminomethylenemalonate and 200 cc. of Dowtherm A (eutectic mixture of diphenyl and diphenyl ether) was heated at 250° C. with stirring for twenty-five minutes. The reaction mixture was then allowed to cool and the solid that separated was collected, washed successively with benzene and n-pentane, and dried to yield 9.0 g. of the product, ethyl 8-bromo-1-hydroxybenzo[f]quinoline-2-carboxylate, M.P. 325° C. with decomposition. Alkaline hydrolysis of the ethyl ester in the usual manner yields the corresponding 8-bromo-1-hydroxybenzo[f]quinoline-2-carboxylic acid.

Diethyl N-(6-bromo-2-naphthyl)aminomethylenemalonate was prepared as follows: A mixture containing 9.5 g. of 6-bromo-2-naphthylamine, 10.0 g. of diethyl ethoxymethylenemalonate and 5 cc. of ethanol was heated on a steam bath for ninety minutes and then further heated to 130° C. The reaction mixture was diluted with ethanol and the solid that separated was collected, triturated with ethanol and dried in a vacuum oven at 60° C. The solid was recrystallized once from n-propanol and once from ethanol to yield 11.0 g. of the product, diethyl N-(6-bromo-2-naphthyl)aminomethylenemalonate, M.P. 335° C. with decomposition.

*Example 2*

8 - bromo - 4-ethyl-1-benzo[f]quinolone-2-carboxylic acid was prepared as follows: A mixture containing 17.3 g. of ethyl 8-bromo-1-hydroxybenzo[f]quinoline-2-carboxylate, 66 cc. of 10% aqueous potassium hydroxide solution and 90 cc. of ethanol was refluxed on a steam bath for about two hours. To the solution was added 5 cc. of ethyl iodide and refluxing was continued for six hours, with occasional further addition of ethyl iodide. An additional 30 cc. portion of 10% aqueous potassium hydroxide solution was added to the reaction mixture to dissolve some solid that had separated. Also added were 30 cc. of ethanol and 10 cc. of ethyl iodide, and the resulting solution was refluxed for an additional eight hours, with further additions of ethyl iodide. The reaction mixture was filtered through infusorial earth and the filtrate was poured into an excess of hydrochloric acid and water.

The resulting precipitate was recrystallized twice from dimethylformamide-water and once from dimethylformamide, washed with ethanol, triturated with boiling ethanol and filtered to yield 7.7 g. of the product, 8-bromo-4 - ethyl - 1-benzo[f]quinolone-2-carboxylic acid, M.P. 298.0–298.8° C. (corr.), with decomposition.

8 - bromo - 4-ethyl-1-benzo[f]quinolone-2-carboxylic acid when tested in vitro against *Clostridium welchii* was found to have bacteriostatic and bacteriocidal activities at the same concentration of 0.025 mg./cc.

*Example 3*

9 - methoxy - 4 - methyl-1-benzo[f]quinolone-2-carboxylic acid was prepared as folows: A mixture containing 25.5 g. of 1,9-dihydroxybenzo[f]quinoline-2-carboxylic acid, 224 cc. of 10% aqueous potassium hydroxide solution, 350 cc. of ethanol and an excess of methyl iodide was refluxed for two hours, with occasional additional quantities of methyl iodide being added. An additional 160 cc. portion of 10% aqueous potassium hydroxide solution and a 50 cc. portion of ethanol were added and the resulting reaction mixture was refluxed for an additional three and one-half hours. The reaction mixture was filtered. The remaining solid was treated with warm 10% aqueous potassium hydroxide solution and filtered. The filtrates were combined and poured into an excess of hydrochloric acid and water; and the resulting solid was collected, washed with water, recrystallized from dimethylformamide, triturated in warm ethanol and dried in a vacuum oven at 60° C. to yield 12.5 g. of the product, 9 - methoxy - 4-methyl-1-benzo[f]quinolone-2-carboxylic acid, M.P. 332–335° C.

9 - methoxy-4-methyl-1-benzo[f]quinolone-2-carboxylic acid was found to have in vivo activity against *Klebsiella pneumoniae* in mice when administered subcutaneously at dose levels of 200 and 400 mg./kg./day (12 out of 30 and 16 out of 30 of the animals survived, respectively.

*Example 4*

4 - ethyl-9-hydroxy-1-benzo[f]quinolone-2-carboxylic acid and 9 - ethoxy-4-ethyl-1-benzo[f]quinolone-2-carboxylic acid were prepared as follows: A 20 g. portion of ethyl 1,9 - dihydroxybenzo[f]quinoline-2-carboxylate was hydrolyzed to the corresponding acid by heating with 200 cc. of 10% aqueous potassium hydroxide solution on a steam bath for ninety minutes. To the solution was added 250 cc. of ethanol and 10 cc. of ethyl iodide. The resulting reaction mixture was refluxed on a steam bath for thirteen hours, during which time three additional 10 cc. portions of ethyl iodide were added. The faintly basic reaction mixture was treated with decolorizing charcoal and filtered. The filtrate was allowed to stand overnight and the solid that separated was collected and triturated with 150 cc. of hot ethanol. The ethanolic suspension was cooled and the solid that separated was collected and recrystallized twice from acetic acid and twice from acetonitrile to yield 7.8 g. of 9-ethoxy-4-ethyl-1-benzo[f]quinolone-2-carboxylic acid, M.P. 221.4–222.6° C. (corr.).

The filtrate from the above reaction mixture was concentrated to a volume of about 200 cc. The material that separated was isolated by decanting off the liquid and it was then dissolved in 100 cc. of ethanol. The ethanolic solution was allowed to stand several days and the resulting precipitate was collected, triturated with 200 cc. of boiling acetonitrile, filtered and dried to yield 0.9 g. of 4 - ethyl - 9-hydroxy-1-benzo[f]quinolone-2-carboxylic acid, M.P. 303–305° C.

9 - ethoxy - 4-ethyl-1-benzo[f]quinolone-2-carboxylic acid when tested in vitro was found to have bacteriostatic activity against *Eberthella typhi* and *Clostridium welchii* at the same concentration of 0.05 mg./cc.

4 - ethyl - 9 - hydroxy-1-benzo[f]quinolone-2-carboxylic acid when tested in vitro was found to have bacteriostatic activity against *Eberthella typhi* and *Clostridium welchii* at respective concentrations of 0.76 mg./cc. and 0.025 mg./cc.

The intermediate ethyl 1,9-dihydroxybenzo[f]quinoline-2-carboxylate was prepared in two steps following the procedures described in Example 1. Diethyl N-(7-hydroxy-2-naphthyl)aminomethylenemalonate (8.0 g., M.P. 123–129° C.) was obtained using 58 g. of 7-amino-2-naphthol, 82 g. of diethyl ethoxymethylenemalonate and 500 cc. of ethanol; the product was recrystallized three times from ethanol. Cyclization of the diethyl N-(7-hydroxy-2-naphthyl)aminomethylenemalonate by heating in Dowtherm A as in Example 1 gave ethyl 1,9-dihydroxybenzo[f]quinoline-2-carboxylate, M.P. 322–324° C. with decomposition, after recrystallization from dimethylformamide.

*Example 5*

4-ethyl-1-benzo[f]quinolone-2-carboxylic acid was prepared as follows: A mixture containing 23.9 g. of 1-hydroxybenzol[f]quinoline-2-carboxylic acid, 19.6 g. of potassium hydroxide (86%) and 300 cc. of ethanol was refluxed on a steam bath until the solids dissolved; 35 cc. of ethyl iodide was added and refluxing was continued for three days. The reaction mixture was allowed to cool and then stand at room temperature over the week end. the resulting precipitate was collected; recrystallized once, with charcoaling, from acetic acid-water (80:20) and washed with water; recrystallized twice from dimethylformamide and washed with water; and dried in a vacuum oven at 80° C. for sixteen hours to yield 9.6 g. of the product, 4-ethyl-1-benzo[f]quinolone-2-carboxylic acid, M.P. 255.6–257.2° C. (corr.).

4 - ethyl-1-benzo[f]quinolone-2-carboxylic acid when tested in vitro was found to have bacteriostatic activity against *Eberthella typhi*, *Clostridium welchii* and *Mycobacterium tuberculosis* at the same concentration of 0.025 mg./cc.; and to have bacteriocidal activity against *Clostridium welchii* and *Mycobacterium tuberculosis* at respective concentrations of 0.076 and 0.025 mg./cc.

*Example 6*

4-methyl-1-benzo[f]quinolone-2-carboxylic acid, a known compound, was prepared as follows: A mixture containing 23.9 g. of 1-hydroxybenzo[f]quinoline-2-carboxylic acid, 19.6 g. of potassium hydroxide (86%) and 300 cc. of ethanol was refluxed on a steam bath until the solids dissolved; 35 cc. of methyl iodide was added whereupon a solid separated immediately; and, the resulting mixture was refluxed for one hour and allowed to stand at room temperture for six days. The solid was collected, recrystallized once from acetic acid-water (80:20) using decolorizing charcoal and twice from dimethylformamide, washed successively with water and acetone, and dried in a vacuum oven at 80° C. to yield 7.9 g. of the product, 4-methyl-1-benzo[f]quinolone-2-carboxylic acid, M.P. 286–288.5° C. (corr.).

4-methyl-1-benzo[f]quinolone - 2 - carboxylic acid was found to have in vivo activity against *Klebsiella pneumoniae* in mice when administered subcutaneously at dose levels of 100, 200 and 400 mg./kg./day (8 out of 10, 15 out of 20, and 16 out of 20 animals survived, respectively) and when administered orally at 400 mg./kg./day (7 out of 10 animals survived); also, this compound was found to have in vivo activity against *Staphylococcus aureus* in mice when administered orally at a dose level of 400 mg./kg./day (10 out of 10 animals survived). This same compound when tested in vitro was found to have bacteriostatic activity against *Staphylococcus aureus*, *Eberthella typhi*, *Clostridium welchii* and *Mycobacterium tuberculosis* at respective concentrations of 0.0025, 0.0025, 0.0076 and 0.005 mg./cc.; and to have bacteriocidal activity against the same organisms at respective concentrations of 0.076, 0.50, 0.025 and 0.005 mg./cc.

4-methyl-1-benzo[f]quinolone-2-carboxylic acid can also be administered as a lower-alkyl ester, e.g., ethyl ester, or in the form of a therapeutically acceptable salt, e.g., sodium salt.

Following the procedures described in Examples 1–6 and using corresponding molar equivalent quantities of the appropriate 1-hydroxybenzo[f]quinoline-2-carboxylic acid (or lower-alkyl ester thereof) and the appropriate lower-alkyl ester, preferably halide or sulfate, the compounds of Table A can be prepared.

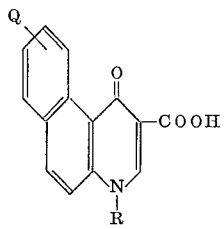

| Example | Q | R |
|---|---|---|
| 7 | 5-Br | CH₃ |
| 8 | 5,6-Cl₂ | C₂H₅ |
| 9 | 6,10-Cl₂ | n-C₄H₉ |
| 10 | 8-OCH₃ | CH₃ |
| 11 | 8-CH₃ | n-C₃H₇ |
| 12 | 8,9-(OCH₃)₂-5-CH₃ | CH₃ |
| 13 | 5,9-(CH₃)₂ | CH₃ |
| 14 | 6-I | C₂H₅ |
| 15 | 10-CH₃ | n-C₆H₁₃ |
| 16 | 7,9-Br₂ | C₂H₅ |
| 17 | 7-OCH₃ | CH₃ |
| 18 | 7-Cl-8-OC₂H₅ | CH₃ |
| 19 | 10-C₂H₅ | C₂H₅ |
| 20 | 5,6,9-Br₃ | C₂H₅ |

The intermediate 1-hydroxybenzo[f]quinoline-2-carboxylic acids (or ethyl esters) needed to prepare the compounds of Table A can be prepared in three (or two) steps following the procedures described in Example 1 for the preparation of 8-bromo-1-hydroxybenzo[f]quinoline-2-carboxylic acid (and its ethyl ester) and using corresponding molar equivalent quantities of the appropriate reactants, illustrated as follows for the compound of Example 12: diethyl N-(6,7-dimethoxy-3-methyl-2-naphthyl)aminomethylenemalonate is obtained by reacting 6,7-dimethoxy-3-methyl-2-naphthylamine with diethyl ethoxymethylenemalonate; ethyl 8,9-dimethoxy-1-hydroxy-5-methylbenzo[f]quinoline-2-carboxylate is formed next in the cyclization step; and, 8,9-dimethoxy-1-hydroxy-5-methylbenzo[f]quinoline-2-carboxylic acid is prepared by hydrolysis of the ethyl ester.

The compounds of Table A can be used per se or in the form of their lower-alkyl esters or therapeutically acceptable salts.

I claim:
1. A compound of the formula

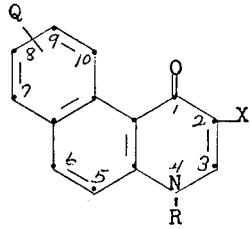

where X is carboxy or lower-carbalkoxy, R is lower-alkyl, and Q is hydroxy, lower alkoxy or halo.

2. A compound in accordance with claim 1 wherein X is carboxy, R is methyl and Q is 8-bromo.

3. A compound in accordance with claim 1 wherein X is carboxy, R is ethyl and Q is 8-bromo.

4. A compound in accordance with claim 1 wherein X is carboxy, R is methyl and Q is 9-methoxy.

5. A compound in accordance with claim 1 wherein X is carboxy, R is ethyl and Q is 9-ethoxy.

6. A compound in accordance with claim 1 wherein X is carboxy, R is ethyl and Q is 9-hydroxy.

7. 4-ethyl-1-benzo[f]quinolone-2-carboxylic acid.

8. A compound of the formula

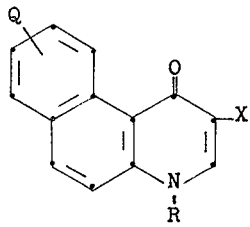

where X is carboxy or lower-carbalkoxy, and R and Q are each lower-alkyl.

No references cited.

ALEX MAZEL, *Primary Examiner.*
DONALD DAUS, *Assistant Examiner.*